United States Patent [19]

Isobe et al.

[11] Patent Number: 4,491,396
[45] Date of Patent: Jan. 1, 1985

[54] AUTOMATIC FOCUSING ZOOM LENS MOUNTING

[75] Inventors: Takashi Isobe, Kanagawa; Shigeru Kamata, Tokyo, both of Japan

[73] Assignee: Canon Kabushiki Kaisha, Japan

[21] Appl. No.: 327,618

[22] Filed: Dec. 4, 1981

[30] Foreign Application Priority Data

Dec. 11, 1980 [JP] Japan .................. 55-174915

[51] Int. Cl.³ .................. G02B 7/10; G02B 7/11; G03B 3/10
[52] U.S. Cl. .................. 350/429; 354/400
[58] Field of Search .............. 350/429, 430, 255; 354/25 N, 25 R, 195, 400, 402, 409; 250/201

[56] References Cited

U.S. PATENT DOCUMENTS

| 4,057,327 | 11/1977 | Kumazawa | 350/429 |
| 4,083,057 | 4/1978 | Quinn | 354/25 N |
| 4,110,769 | 8/1978 | Schutz et al. | 350/429 |
| 4,160,596 | 7/1979 | Reynard | 354/195 |
| 4,191,460 | 3/1980 | Fujika | 354/25 N |
| 4,272,174 | 6/1981 | Terramoto et al. | 354/195 |
| 4,275,954 | 6/1981 | Dobashi | 354/400 |
| 4,283,131 | 8/1981 | Ohnuki et al. | 354/195 |
| 4,294,526 | 10/1981 | Nakagawa | 354/402 |
| 4,309,077 | 1/1982 | Tomori | 350/255 |
| 4,349,258 | 9/1982 | Kitai et al. | 354/400 |
| 4,353,634 | 10/1982 | Himmelsbach | 350/429 |
| 4,364,648 | 12/1982 | Kitai et al. | 354/409 |

FOREIGN PATENT DOCUMENTS

| 73025 | 6/1980 | Japan | 354/195 |
| 73026 | 6/1980 | Japan | 354/195 |

Primary Examiner—Jon W. Henry
Attorney, Agent, or Firm—Toren, McGeady and Stanger

[57] ABSTRACT

This invention concerns with the technique of controlling axial movement of a focusing member in the objective lens system based on the signal representing the object distance from the automatic distance measuring means. More particularly, as the provision for manual and automatic focusing modes is made, it relates to a technique of building a mode selection mechanism into the mechanical mounting for the zoom lens.

2 Claims, 4 Drawing Figures

AUTOMATIC FOCUSING ZOOM LENS MOUNTING

BACKGROUND OF THE INVENTION

1. Field of the Invention

This invention relates to mechanical mountings for lens systems, among others, zoom lens systems, and more particularly to a mechanical mounting for a zoom lens operable with the selection of the manual and automatic focusing modes.

2. Description of the Prior Art

Many zoom lenses are now available in the camera market, and new zoom lenses are being proposed one after another. For the zoom lenses, on consideration of their operating aspect, there are two types of mounting mechanisms, one of which makes use of a focusing actuator and a zooming actuator as arranged to be operable independently of each other, or which may be called "two-actuator operating" form, and the other of which has the focusing actuator and the zooming actuator to be served by one and the same member, as, for example, the slide movement of the single member effects zooming and its rotative movement effects focusing, or which may be called "single-actuator operating" form. These two forms each have one merit and one demerit and, therefore, it is of importance to make an appropriate choice of which is suited for the given optical system and the required performance of the lens mounting.

Also, recently there has been proposed in the field of photographic engineering so-called automatic focusing apparatus in which the object distance is measured and the objective lens (focusing member) is automatically moved to an in-focus position. With this automatic focusing apparatus used in a single lens reflex camera having the aforesaid two-actuator operating type lens mounting so that the position of the focusing member of the zoom objective is automatically adjusted, when to shoot, the photographer needs only to actuate the zoom ring for optional focal length settings. This allows for the photographer to concentrate his all nerves on the composition of a picture and to obtain photographs as he has intended. And, this automatic focusing provision made at the zoom lens mounting and particularly the aforesaid two-actuator operating type zoom lens mounting gives an advantage that whilst the characteristic features of the two-actuator operating type zoom lens mounting, for example, the fact that the operating mechanism of the lens mounting is unnecessarily made much complicated, and the merit that the mistaking actuation as in the single-actuator operating type is avoidable, are preserved, the convenience, easiness and quick management characteristic of the single-actuator operating type are additionally acquired.

SUMMARY OF THE INVENTION

With the foregoing in mind, it is an object of the present invention to a mechanical mounting for a zoom lens with its operating mechanism of the two-actuator type made capable of automatic focusing control.

The aforesaid automatic focusing apparatus includes a light sensitive transducer receptive of an image of an object to be photographed for producing electrical signals which are processed to find the object distance, and therefore only operates with supply of electrical energy. If the energy of the battery is exhausted, and there is no new one in hand, the camera can be no longer used to shoot.

It is, therefore, another object of the present invention to make the camera able to meet the requirements of such a situation and to provide for an automatic focusing mechanical mounting for a zoom lens with a manual focusing control mechanism.

The provision of the manual focusing control mechanism has also a complementary significance that in case an object intended to be photographed lies beyond the accurately distance measurable range of the automatic focusing apparatus, or in the blind area, focusing can be even carried out, though visually and manually.

Still another object of the present invention is to provide a mechanical mounting for a zoom lens system, said system comprising three or four components, of which two are movable for zooming, and another component which is movable for focusing, which mounting can be selectively operated in the automatic and manual focusing modes.

As the automatic and manual focusing control mechanisms are operatively connected to each other through the focusing lens holder, when the automatic focusing is being performed, the manual focusing actuator on the lens barrel is caused to move or turn about the lens axis, thus producing a bad influence on the management of the camera. For example, while aiming the camera at an object in the right composition and with the right illumination, the photographer will push the release button. Then, if the focusing ring turns suddenly, the right holding of the camera with the lens will be broken. To avoid this, it is, therefore, preferred to take the manual focusing actuator or focusing ring out of connection with the operating mechanism and lock the focusing ring to the lens barrel when in the automatic focusing mode.

Another object of the invention is, therefore, to improve the management of the zoom lens, and to provide a locking mechanism for the manual focusing actuator operating when the automatic focusing mode is selected.

DESCRIPTION OF THE PREFERRED EMBODIMENTS

Figure 1:
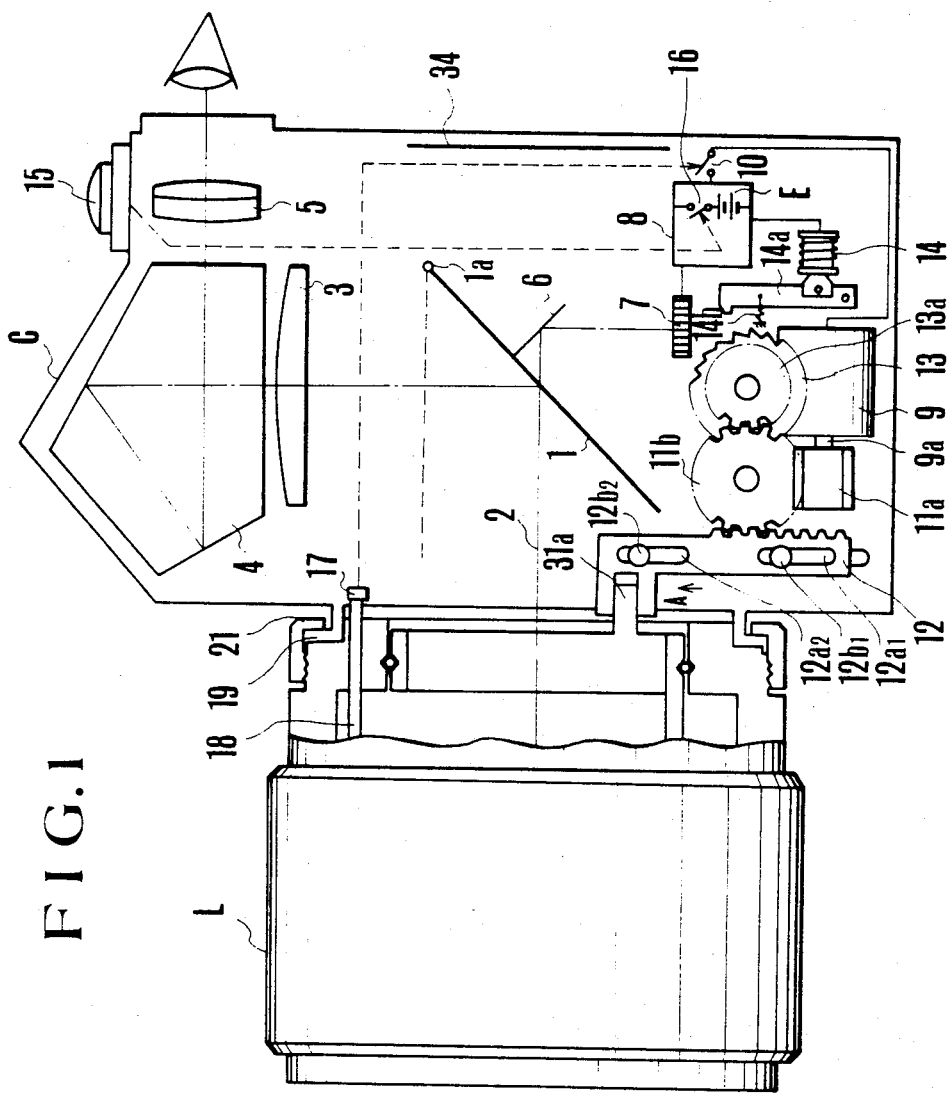
FIG. 1 is a schematic elevational view, partly in section, of a camera with lens mounting employing one form of the present invention, particularly regarding the drive connection therebetween.

FIG. 1 illustrates arrangement of a distance measuring device and a driving mechanism of which the operation is controlled by the output of the device in the interior of a camera body C, and a drive connection between an output member of said driving mechanism and an automatic focusing control member in the lens mounting L.

In the drawing, the lens mounting L is illustrated as an interchangeable lens mounting. A reference numeral 1 denotes a half-mirror for reflecting part of light 2 entering through and emerging from an objective lens system L1 to L4 in the mounting L to a finder optical system. The half-mirror 1 is pivotally supported at a pin 1a. The finder optical system is of known construction, including a condenser lens 3, a pentaprism 4 and an eye-piece 5. Pivotally mounted on the back surface of the aforesaid half-mirror 1 is a sub-mirror 6 to direct the transmitted part of light through the half-mirror to a line sensor 7 cooperating with a focus detecting device. The line sensor 7 in the form of one or more photo sensor array or arrays of a great number of charge storage type, or charge storage followed by discharge type sensor elements receives an image of an object formed by the objective lens L1 to L4 and produces outputs at the individual photo sensor elements which are then processed in time sequential manner so as to scan the object image electrically until the condition of sharp focus is detected. Other suitable image sharpness measuring devices of known construction may be used instead. 9 is a driving power source means, for example, electric motor, connected to a battery E through a 1st current supply control switch 10. Motion of the motor 9 is transmitted from an output shaft 9a through a gear train 11a and 11b to a driving member 12. The member 12 has two elongated slots 12a1 and 12a2 which respective pins 12b1 and 12b2 penetrate so that the driving member 12 moves in vertical directions.

A ratchet wheel 13 fixedly carries a gear 13a meshing with the gear 11b and cooperates with an arresting or pawl lever 14a of an electromagnetic means 14 of which the operation is controlled by a signal from the aforesaid focus detecting device 8.

A release button 15 in the upper panel of the camera housing when pushed down closes a 2nd current supply control switch 16, thereby the aforesaid focus detecting device 8, motor 9 and solenoid 14 are supplied with current from the battery E. The opening and closing operation of the 1st switch 10 is controlled by a pin 17 in cooperation with an actuator pin 18 which is arranged in the lens mounting L to project and retract when the manual focusing actuator or focusing ring on the outermost lens barrel is brought into and taken out of registry with an index AF representing the automatic focusing mode.

Next explanation is given to the details of the construction of the zoom lens mounting mechanism of the invention.

Figure 2:
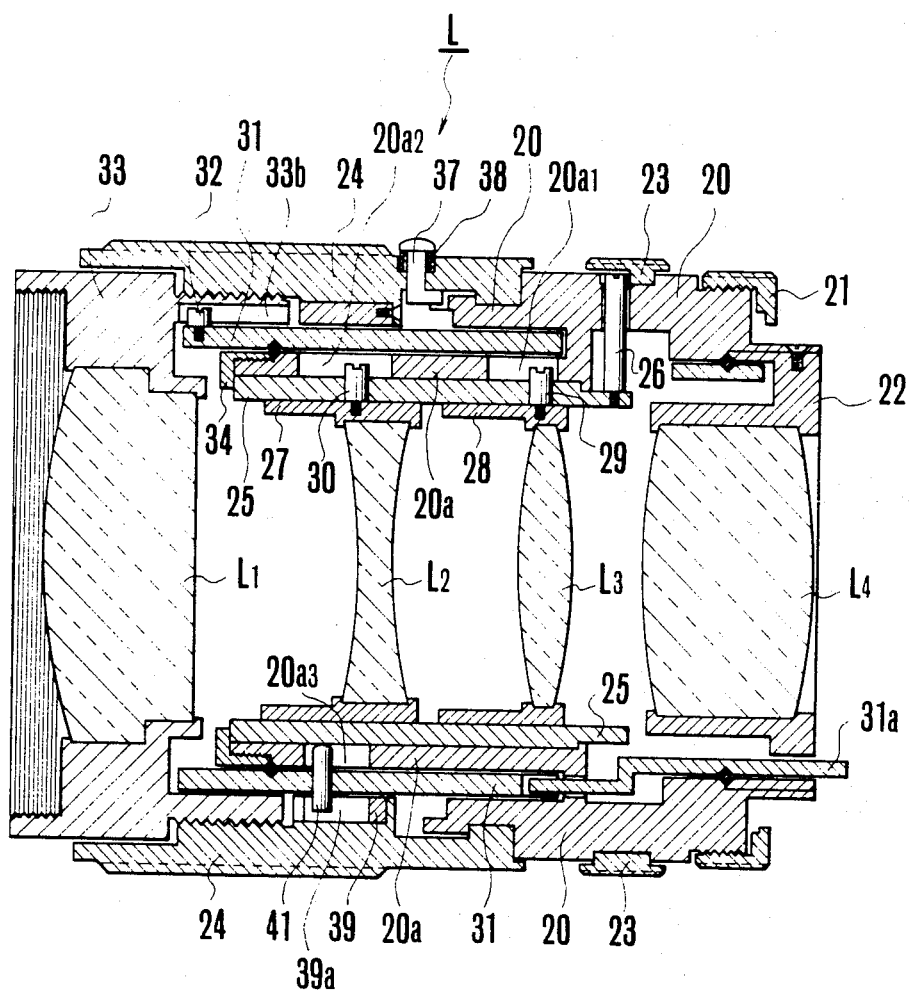
FIGS. 2 and 3 illustrate an embodiment of a lens mounting mechanism according to the present invention, FIG. 2 being a longitudinal section and FIG. 3 being a fragmentary exploded perspective view of the main parts thereof.
Figure 3:
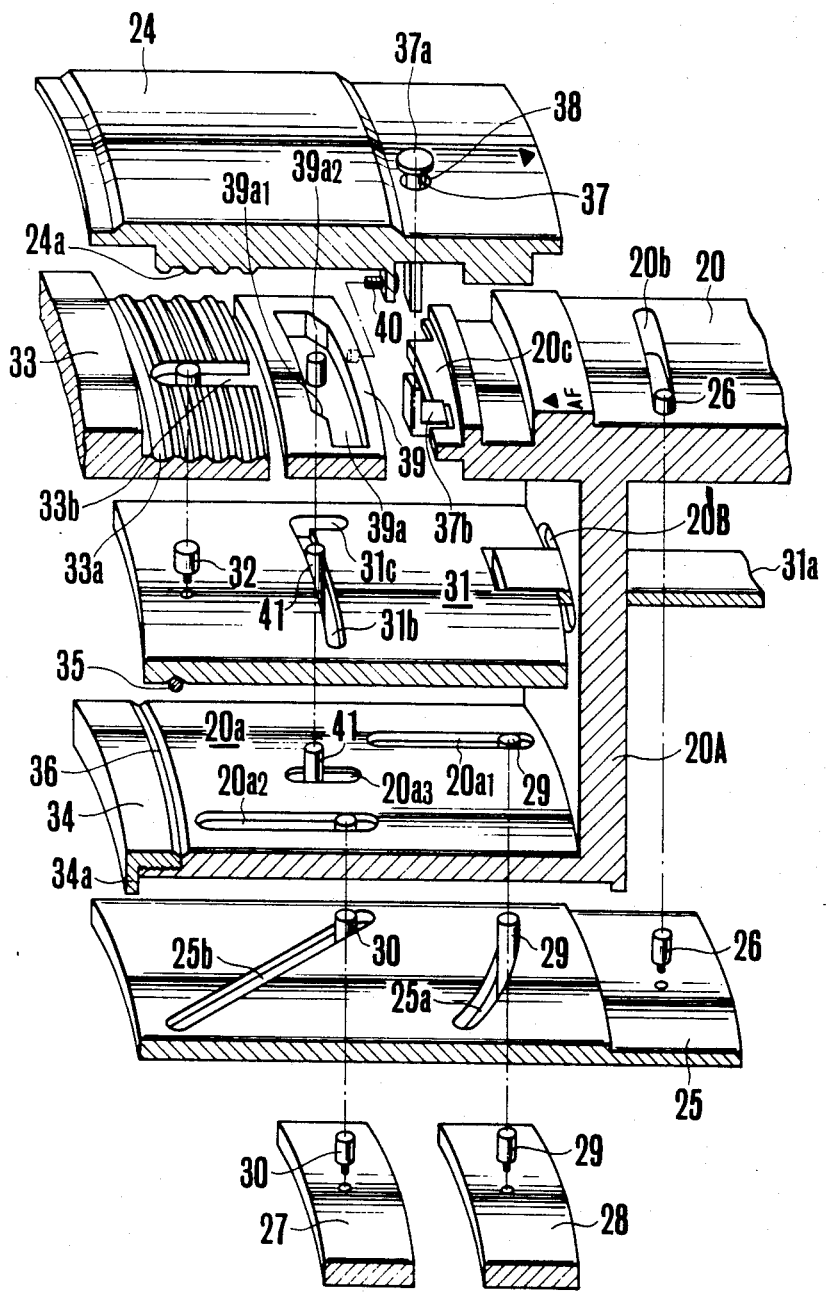

In FIGS. 2 and 3, the zoom objective comprises a 1st component L1' for focusing, 2nd and 3rd components L2 and L3 for zooming, and a 4th or relay component L4. The mounting mechanism illustrated here is adapted for the 4-component zoom objective, but it is to be understood that the principles of the invention are applicable to mounting mechanisms for so-called 3-component (L1, L2, L3) zoom objectives.

A body tube 20 has a bayonet mount ring 21 at the rear end thereof for releasable attachment to the camera body C. A lens holder 22 contains the relay component L4 and is fixedly secured to the inner diameter of the body tube 20. Rotatably fitted on the outer diameter of the body tube 20 are a zooming actuator 23 and a manual focusing actuator 24. An auxiliary body tube 20a of smaller outer diameter than the inner diameter of the main body tube 20 is either molded in unison with, or fixedly secured through a radial flange, to the latter. A zoom control cam sleeve 25 is rotatably fitted in the inner diameter of the auxiliary body tube 20a. The zooming actuator 23 and the cam sleeve 25 are connected to each other by a pin 26 radially extending from the sleeve 25 through a traversely elongated slot 20b in the body tube 20 to engage the actuator 23. Lens holders 27 and 28 contain the components L2 and L3 respectively and are freely fitted in the inner diameter of the cam sleeve 25. Cam follower pins 29 and 30 extend from the lens holders 27 and 28 respectively through 1st and 2nd helically elongated slots 25a and 25b in the cam sleeve 25 and engage in 1st and 2nd axially elongated slots 20a1 and 20a2 in the auxiliary body tube 20a.

An automatic focusing control member 31 is positioned in a space between the main and auxiliary body tubes 20 and 20a, and has an axially rearwardly extending arm 31a which is arranged to engage the driving member 12 in the camera body C of FIG. 1, as it passes through an opening 20B in the radial flange 20A of the body tube 20. A drive connection in the form of a pin 32 extends radially outwardly of the automatic focusing control member 31 into an axially elongated slot or groove 33b formed in the inner surface of a helicoid portion 33a of a focusing component holder 33 which threadedly engages the aforesaid manual focusing actuator 24. A positioning collar 34 is fixedly secured to the aforesaid auxiliary body tube 20a at the front end thereof, and its radial flange 34a restrains the aforesaid cam sleeve 25 from axial movement. A ball bearing 35 is mounted in a circumferential groove formed at the interface between the collar 24 and the front end of the auxiliary body tube 20a so that the aforesaid automatic focusing control member is smoothly rotatable.

A lock member 37 is provided for locking the manual focusing actuator 24 to the body tube 20 and is urged by a coil spring 38 to an outward direction. Said lock member 37 has its head 37a exposed out of the manual focusing actuator ring 24 and its bottom end turned to form a foot 37b beneath a flanged portion 20c provided in the body tube 20. When an index mark of regular triangle on the manual focusing actuator ring 24 is registered with a similar index mark labelled AF representing the automatic focusing position on the body tube 20, the aforesaid foot 37b enters a detent slot 20d in the flanged portion 20c, thereby the manual focusing actuator is locked to the lens mounting when in the automatic focusing mode.

A switching member 39 is provided for inhibiting or allowing movement of the aforesaid automatic focusing control member depending upon which of the automatic and manual modes is selected. The switching member 39 is fixedly secured to the inner surface of the manual focusing actuator 24 by screw fasteners 40 and has an opening 39a into which the upper end of a control pin 41 projects. Said control pin 41 passes through a slot 31b or 31c formed in the aforesaid automatic focusing control member 31 so that its opposite end engages in an axially elongated groove 20a3 formed in the outer surface of the auxiliary body tube 20a. The radial wall of the opening 39a has 1st and 2nd tapered portions 39a1 and 39a2 which are arranged so that when the manual focusing actuator 24 is turned to read a focusing scale MF, the 1st tape 39a1 moves the control pin 41 to the axial slot 31c, and when to the AF position, the control pin 41 is transited from the axial to the traverse slot 31b by the taper 39a2. The aforesaid switching member 39, control pin 41, slots 31b and 31c and axial slot 20a3 constitute a focusing mode setting means.

The operation of the camera with the lens mounting of such construction is as follows:

To select the automatic focusing mode and set it on the camera, after the interchangeable lens mounting L has been attached to the camera body C, the manual focusing actuator 24 is turned to place its index mark in registry with the AF-labelled index mark on the lens barrel 20. During this time, the photographer needs to push down the lock member 37, thereby the foot 37b is moved so as to slide on the inner surface of the flanged portion 20c of the body tube, until the aforesaid triangular index marks are registered with each other in the AF position where the manual focusing actuator is locked to the lens barrel by the foot 37b engaging in the detent slot. Since, at the same time, the mode setting control pin 41 is caused to enter the traverse slot 31b, the automatic focusing control member 31 is rendered operative. Thus, the automatic focusing mode is set.

While aiming the camera at an object intended to be photographed, the photographer will push down the release button 15, thereby the switch 16 is closed to supply the image sharpness measuring device 8 and motor 9 with current from the battery E. The energized solenoid 14 then moves the pawl lever 14a away from the ratchet wheel 13 against the force of the spring 14b. In this state, while the line sensor 7 receives an image the object formed by the light 2 entering through the zoom objective L1 to L4, transmitting through the half-mirror 1 to the sub-mirror 6 and therefrom directed to the line sensor 7, the in-focus detecting device 8 starts to process the output signals from the line sensor 7.

Motion of the motor 9 is transmitted through the gear train 11a and 11b to move the slide 12 upwards as indicated by an arrow A. Such linear movement is transmitted to rotative movement of the automatic focusing control member 31 about the optical axis, which is then transmitted to axial movement of the focusing lens holder 33 by the helicoid-threaded engagement with the locked manual focusing actuator 24, as the lens holder 33 is turned about the optical axis by the drive connection of the pin 32 in the slot 33b. When the condition of sharp focus is detected, the device 8 produces a de-actuating signal, thereupon the duration of energization of the solenoid 14 and motor 9 is terminated, and the rotating ratchet wheel 13 is arrested by the pawl lever 14a. Thus, the zoom objective is sharply focused and held stationary in this position.

The photographer will then turn the zoom actuator 23 about the optical axis, thereby the cam sleeve 25 is turned along therewith. Such rotative movement of the cam sleeve 25 is transmitted to differential axial movement of the zoom lens component holders 27 and 28 by the 1st and 2nd cam mechanisms of the pins 30 and 29, helical slots 25a and 25b and axial slots 20a2 and 20a1. Thus, the image magnification is changed, while effecting the image shift compensation.

To switch the camera from the automatic to the manual focusing mode, the operator needs first to push down the lock member 37 at its head 37a, thereby the foot 37b is disengaged from the detent slot in the flanged portion 20c to render rotatable the manual focusing actuator 24. Then when the manual focusing actuator 24 is turned away from the AF position by a certain angular distance, the mode selection control pin 41 in the opening 39a of the aforesaid switching member 39 is caused to move from the slot 31b to the slot 31c in the automatic focusing control member 31 as the pin 41 is pushed by the tapered surface 39a1 formed in the side wall of the opening 39a, thereby the automatic focusing control member 31 is restrained from rotation. Further rotative movement of the manual focusing actuator is transmitted to axial movement of the focusing component holder 33 by the helicoid-threaded engagement with each other since the holder 33 is so guided by the pin 32 on the locked automatic focusing control member 31.

Figure 4:
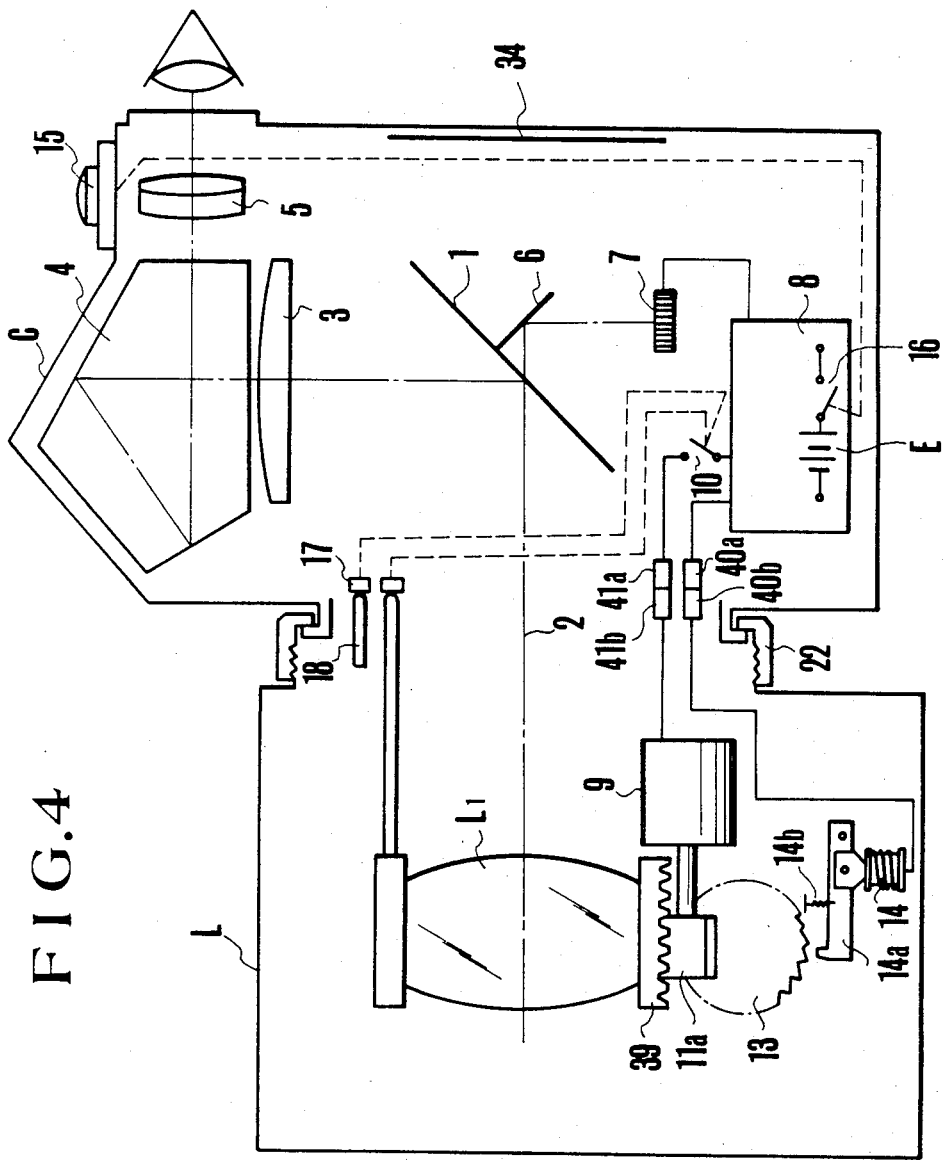
FIG. 4 illustrates another example of arrangement of the automatic focusing apparatus.

FIG. 4 illustrates another embodiment of the automatic focusing camera particularly with an example of modification of the driving mechanism for the automatic focusing control member as incorporated into the lens mounting. In FIG. 4 the same reference characters have been employed to denote the similar parts to those illustrated in FIGS. 1 to 3. In this embodiment, the driving power source or motor 9, power transmitting means 11a and arresting means 14 for the ratchet wheel 13 are arranged in the interior of the lens mounting, and are connected through two pairs of interconnection terminals 40a and 40b, and 41a and 41b to the battery E and the image sharpness measuring device 7 and 8 which are left in the camera body C.

The embodiment of FIG. 4 is substantially similar in construction to the embodiment of FIGS. 1 to 3, except whether or not all the mechanical parts of the automatic focusing apparatus are positioned in the mechanical mounting for the objective lens.

As has been described above in greater detail, the present invention is to provide a mechanical mounting for a zoom objective of the type having a focusing component different from the zoom components, wherein the aforesaid focusing component is made automatically adjustable to sharp focus settings, leaving the necessary lens management limited only to the zooming actuation, whereby the troublesome visual and manual focusing procedure is allowed to be solely undertaken by the camera itself, thus the photographer is able to concentrate his nerves in seeking a better photographic composition and lighting controls, while nevertheless not permitting any uncertainties to be introduced into the focusing procedures as is in the conventional ones.

Another feature is that the automatic focusing camera is provided with a manual focusing control mechanism, whereby the camera can be selectively operated in the automatic and manual focusing modes. Therefore, even when it happens that the automatic focusing is no longer performed because of the object lying in the blind area or the fall of the battery voltage below the satisfactory operating level, the automatic focusing camera of the present invention can be even used to shoot. Particularly as the present invention is adapted for zoom objectives having the focusing provision made at a different component from the zoom components, since the selecting mechanism of the manual and automatic focusing modes is very advantageous at the 3-component zoom objectives with or without the 4th or relay component, it is made possible to improve the easy and quick management of the telephoto zoom objectives and long focal length zoom objectives.

What is claimed is:

1. A lens assembly for manually moving a focusing lens along the optical axis and for automatically focusing the lens in accordance with the signal from distance detecting means, comprising:
   (a) manual distance operation means for manually focusing the lens;
   (b) driving means for driving the focusing lens in accordance with the signal from the distance detection means, said driving means having a transmitting member for applying the force of the driving means to the focusing lens;

(c) control means coupled to the transmitting member for preventing the operation of the transmitting member during manual focusing and allowing the operation of the transmitting member during automatic focusing, said control means including a control member for preventing and allowing operation of the transmitting member and including change-over means for changing the control member between a preventing position and an allowing position, said change-over means being in operative engagement with the manual distance operation means so as to guide the control member to the preventing position and the allowing position, the transmitting member including a prohibiting portion having a circumferential groove and an axial groove ending in the circumferential groove, said control member being guided by said change-over means into the circumferential groove to allow operation of the transmitting member and into the axial groove to prevent operation of the transmitting member.

2. A lens barrel interchangeable between an auto focus mode and a manual focus mode, comprising:
a focusing lens having an optical axis and changeable between an automatic focus operation mode and a manual focus operaton mode;
a focusing lens holder for holding the focusing lens and having a longitudinal slot;
a focus actuating member for moving said focusing lens to an in-focus position and between the autofocus mode and the manual focus mode by rotating around the optical axis and closing an actuating switch of object distance detecting means at a predetermined position around the optical axis;
an automatic focus control member rotatable around the optical axis on the basis of a signal of said object distance detecting means;
said automatic focus control member having an arcuate slot and a longitudinal slot;
a fixed barrel having said automatic focus control member inserted therein, and having a longitudinal slot, said focus lens holder and said focus actuating member being helicoidally connected,
said automatic focus control member having an engaging member mounted thereon for engagement with the longitudinal slot formed on said focusing lens holder;
change-over means driven by the change-over of said focusing lens between the automatic focus operation mode and the manual focus operation mode,
said change-over means including a switching member attached to said focus actuating member and having an opening portion,
a control member for engaging said longitudinal slot of said fixed barrel with said arcuate or longitudinal slot of said automatic focus control member and said opening portion of said switching member,
said opening portion of said switching member having first and second portions for switching said control member to said arcuate slot or said longitudinal slot of said automatic focus control member in association with the change-over operation of said focus actuating member between the auto focus mode and the manual focusing mode.

* * * * *